United States Patent
Curnalia et al.

(10) Patent No.: US 7,782,603 B2
(45) Date of Patent: Aug. 24, 2010

(54) TOOL-LESS ELECTRONIC COMPONENT RETENTION

(75) Inventors: Michael Allen Curnalia, Tucson, AZ (US); Kenji Hidaka, Kanagawa-ken (JP); Michihiro Okamoto, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 293 days.

(21) Appl. No.: 11/692,662

(22) Filed: Mar. 28, 2007

(65) Prior Publication Data

US 2008/0239651 A1 Oct. 2, 2008

(51) Int. Cl.
*G06F 1/16* (2006.01)
*H05K 5/00* (2006.01)
*H05K 7/00* (2006.01)

(52) U.S. Cl. ............... 361/679.33; 361/679.55; 361/748; 361/760

(58) Field of Classification Search ......... 361/685, 361/679.33, 754, 760, 679.55, 748, 752
See application file for complete search history.

(56) References Cited

U.S. PATENT DOCUMENTS

| | | | |
|---|---|---|---|
| 5,305,180 A | 4/1994 | Mitchell et al. | |
| 5,518,412 A * | 5/1996 | Larabell | 439/157 |
| 5,520,069 A * | 5/1996 | Rynders et al. | 74/520 |
| 5,734,549 A | 3/1998 | Oura | |
| 5,790,373 A * | 8/1998 | Kim et al. | 361/679.31 |
| RE35,915 E | 10/1998 | Hastings et al. | |
| 5,943,208 A * | 8/1999 | Kato et al. | 361/679.31 |
| 6,008,984 A * | 12/1999 | Cunningham et al. | 361/679.31 |
| 6,227,516 B1 | 5/2001 | Webster, Jr. et al. | |
| 6,266,250 B1 * | 7/2001 | Foye | 361/760 |
| 6,268,977 B1 | 7/2001 | Yamada et al. | |
| 6,297,954 B1 | 10/2001 | Seo | |
| 6,616,106 B1 * | 9/2003 | Dean et al. | 361/679.58 |
| 6,625,014 B1 * | 9/2003 | Tucker et al. | 361/679.33 |
| 6,633,486 B2 * | 10/2003 | Coles et al. | 361/726 |
| 6,795,309 B2 | 9/2004 | Hartung et al. | |
| 6,853,547 B2 | 2/2005 | Williams et al. | |
| 6,862,178 B2 | 3/2005 | Liao | |
| 6,906,918 B2 | 6/2005 | Rabinovitz | |
| 7,016,189 B2 * | 3/2006 | Lin | 361/679.34 |
| 7,016,190 B1 | 3/2006 | Chang | |
| 7,154,757 B1 * | 12/2006 | Pavol et al. | 361/679.34 |
| 7,167,371 B2 * | 1/2007 | Coles et al. | 361/726 |
| 7,262,958 B2 * | 8/2007 | Marroquin et al. | 361/679.33 |
| 7,362,585 B2 * | 4/2008 | Chen et al. | 361/729 |
| 7,403,382 B2 * | 7/2008 | Robertson et al. | 361/679.41 |

(Continued)

OTHER PUBLICATIONS

U.S. Patent Application entitled "Mounting Electronic Components" Serial No. Unknown, filing date Mar. 28, 2007, by inventors Y. Fujie, K. Hidaka, K. Nakase, M. Okamoto K.R. Schneebeli and T. Wagatsuma.

*Primary Examiner*—Jayprakash N Gandhi
*Assistant Examiner*—Adrian S Wilson
(74) *Attorney, Agent, or Firm*—Janaki K. Davda; Konrad Raynes and Victor LLP

(57) ABSTRACT

Provided is an apparatus comprising a latch mechanism, wherein the latch mechanism comprises a touch point, push points, pull back handles, and a latch tongue adapted to move up and down, wherein the latch tongue is adapted to being inserted into a retention hole.

16 Claims, 14 Drawing Sheets

U.S. PATENT DOCUMENTS

| | | | |
|---|---|---|---|
| 2004/0022034 A1* | 2/2004 | Coles et al. | 361/726 |
| 2005/0141188 A1 | 6/2005 | Collins, III et al. | |
| 2005/0141189 A1 | 6/2005 | Chen et al. | |
| 2005/0152106 A1* | 7/2005 | Coster et al. | 361/683 |
| 2005/0174730 A1* | 8/2005 | Chen et al. | 361/685 |
| 2006/0268509 A1* | 11/2006 | Marroquin et al. | 361/687 |
| 2007/0242426 A1 | 10/2007 | Coster et al. | |
| 2007/0279884 A1* | 12/2007 | Hardt et al. | 361/796 |

* cited by examiner

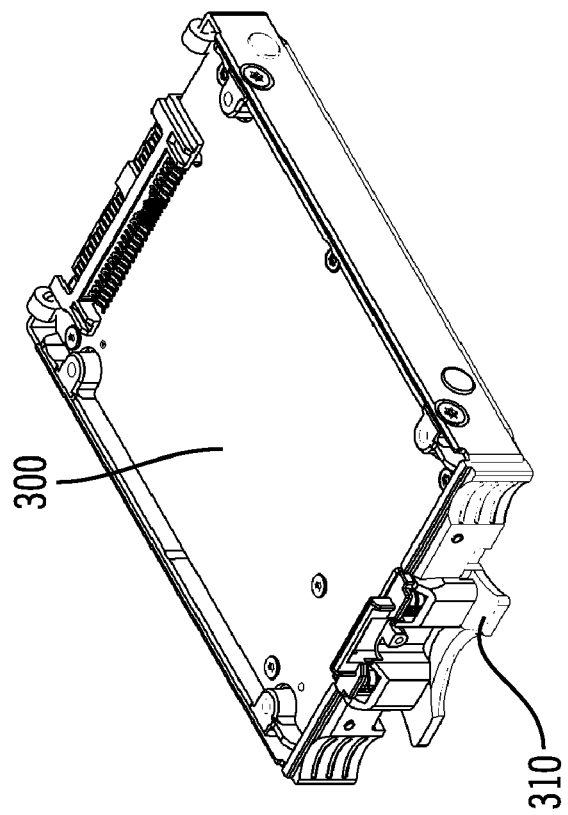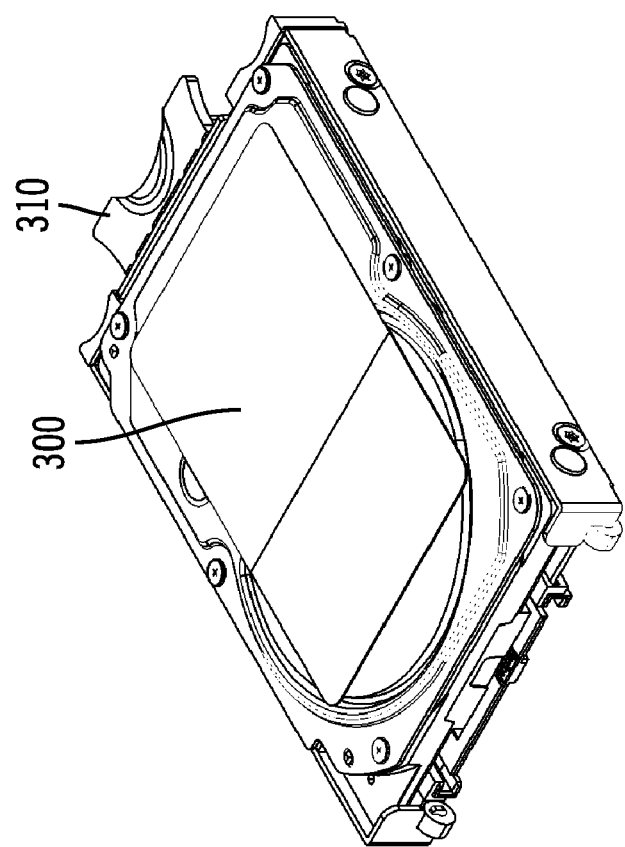

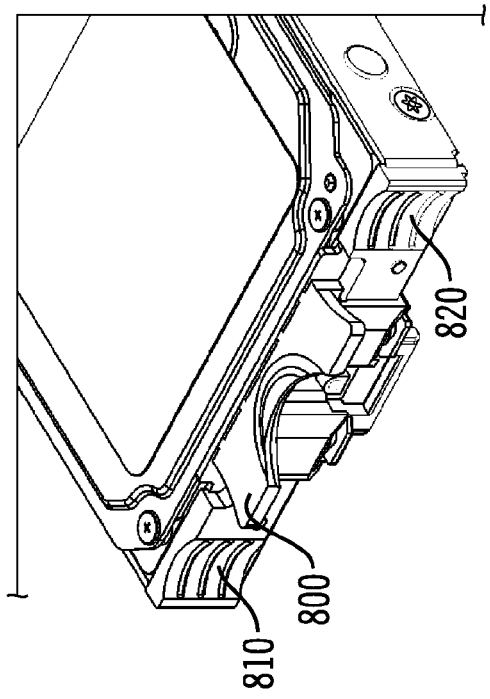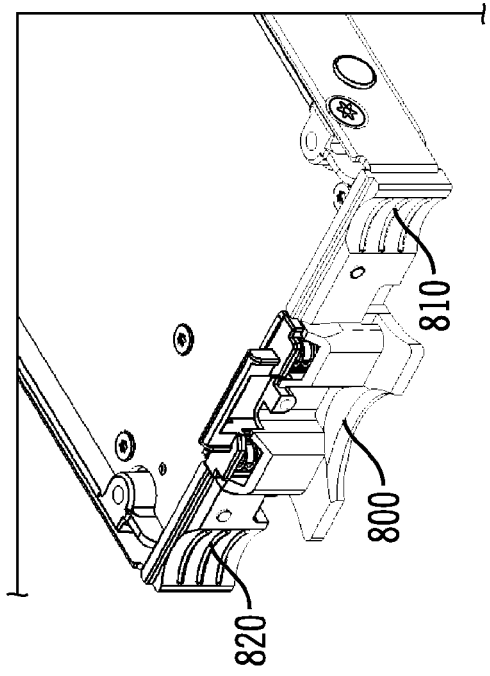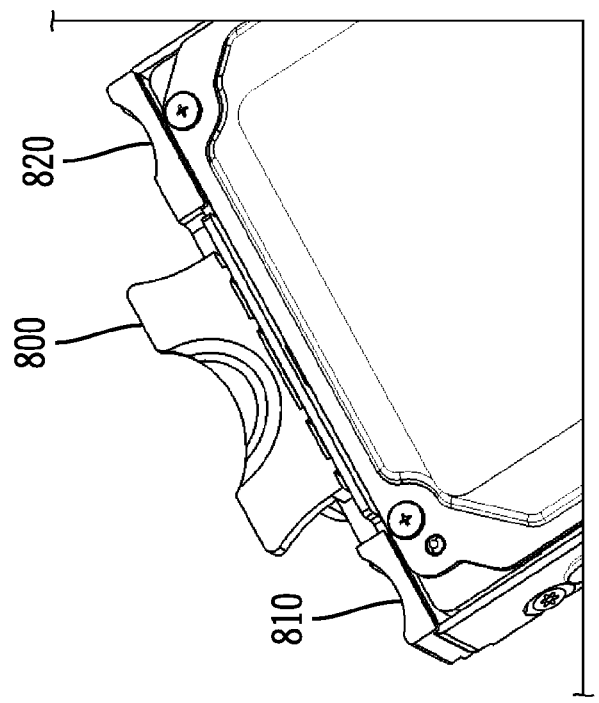

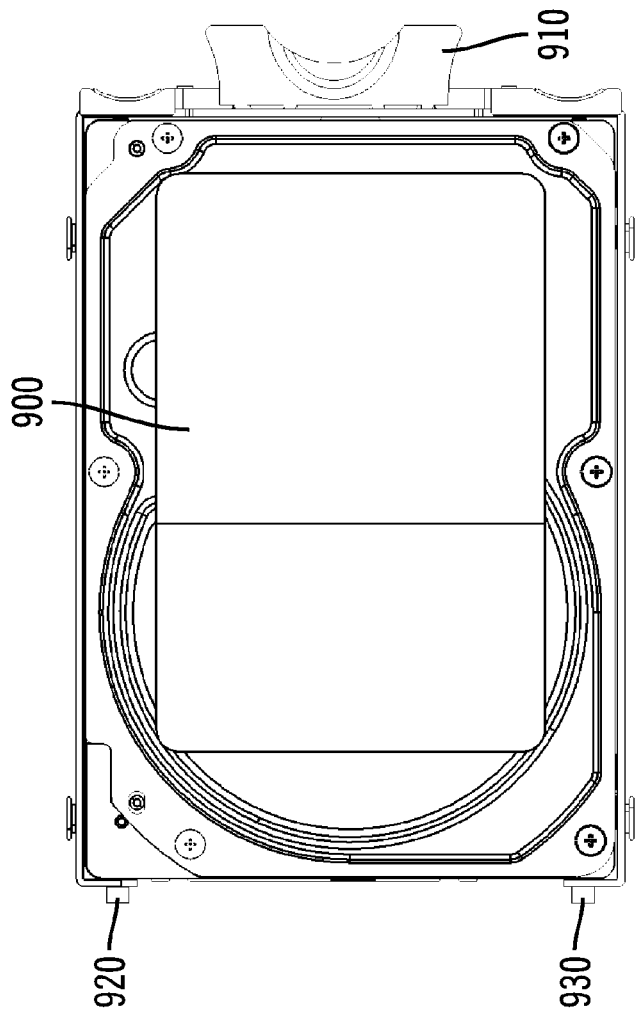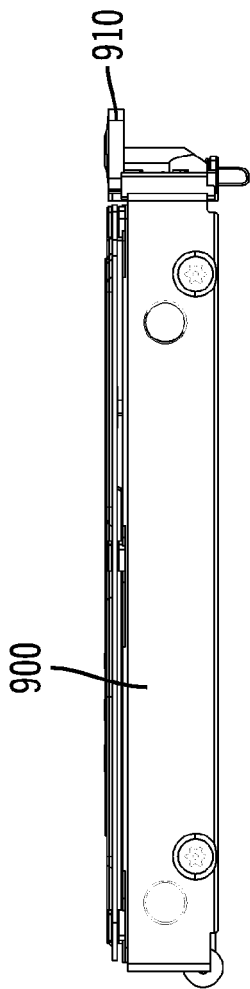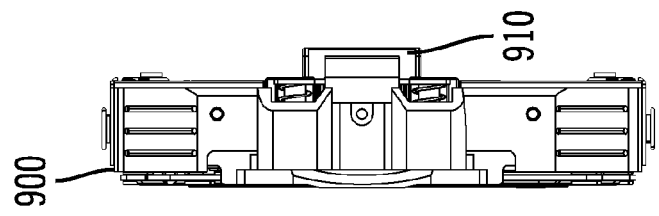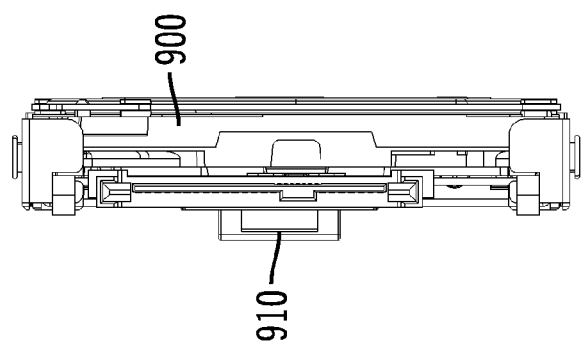

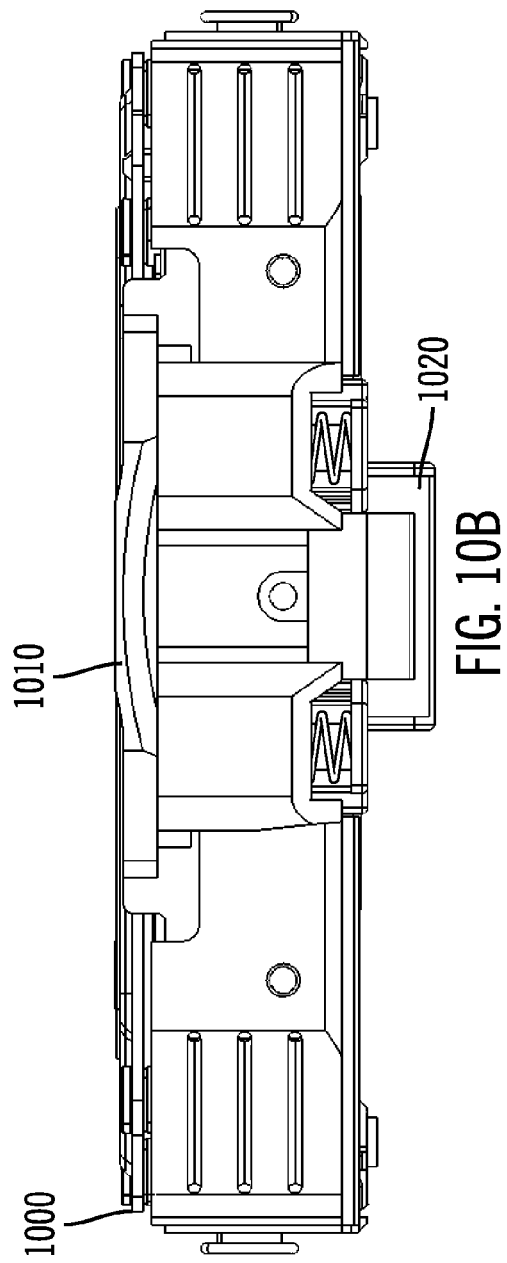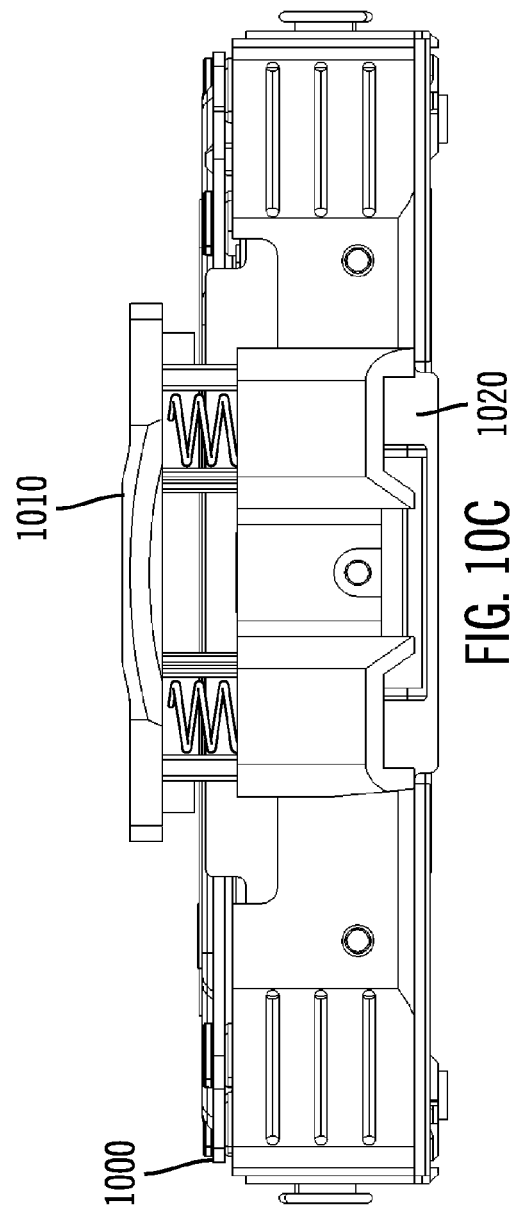

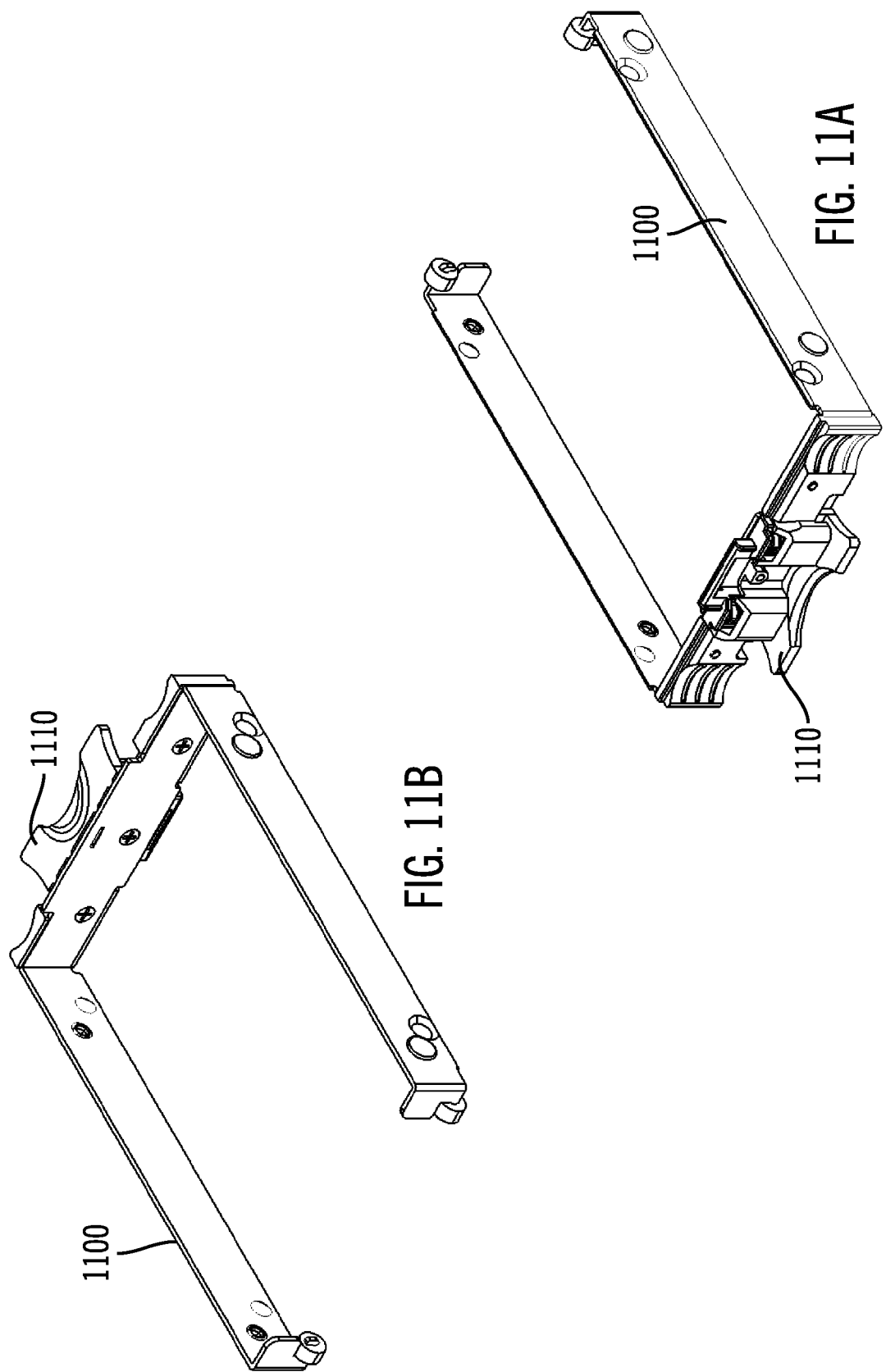

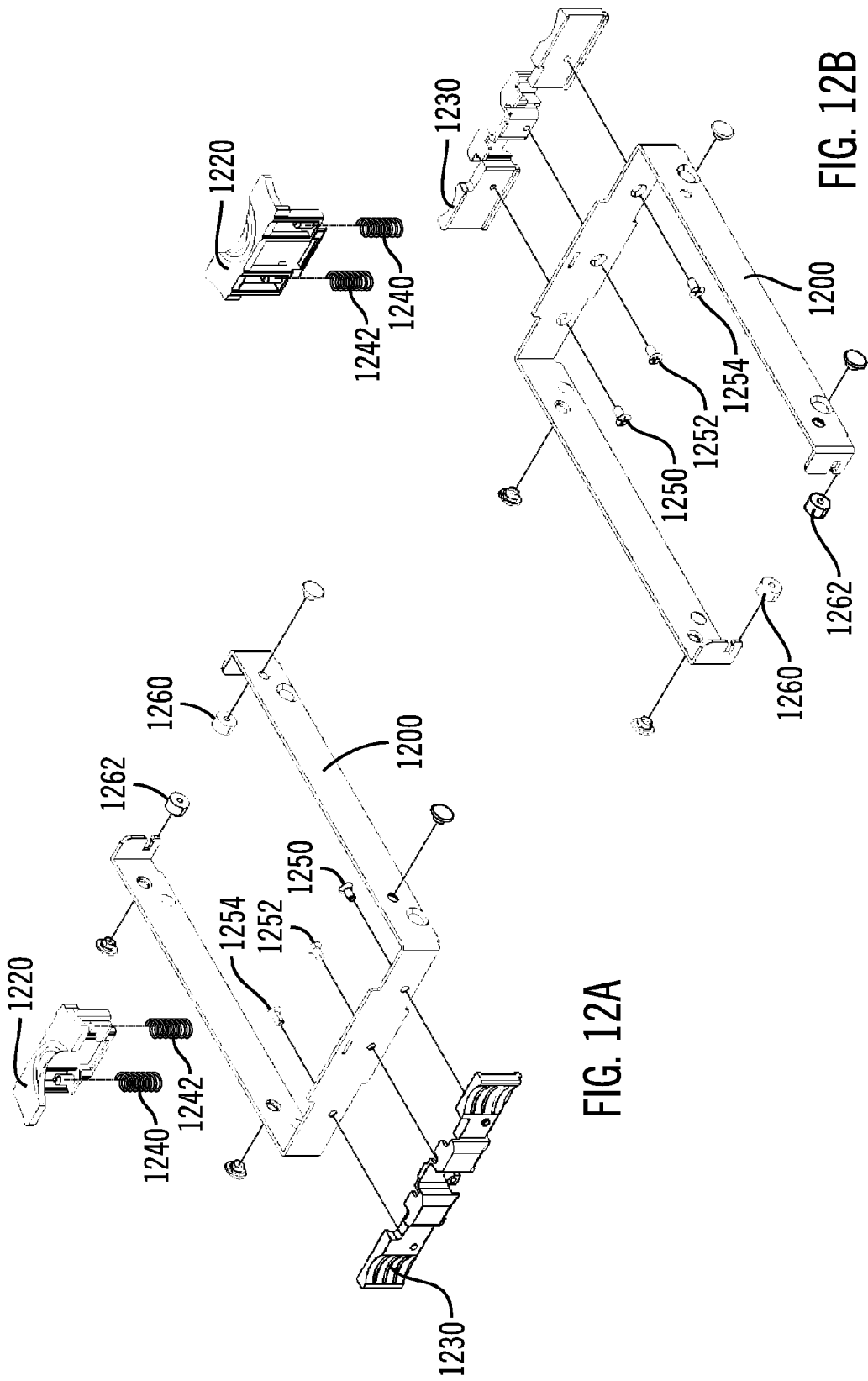

US 7,782,603 B2

TOOL-LESS ELECTRONIC COMPONENT RETENTION

CROSS-REFERENCE TO RELATED APPLICATIONS

This application is related to commonly owned and application Ser. No. 11/692,555 entitled "MOUNTING ELECTRONIC COMPONENTS," by Yoshihiro Fujie, et al., filed on Mar. 28, 2007, and which is incorporated by reference herein in its entirety.

BACKGROUND

1. Field

Embodiments of the invention relate to tool-less electronic component retention.

2. Description of the Related Art

Some server and storage products achieve tool-less design for mounting electronic components in the system enclosure. Examples of electronic components include Hard Disk Drives (HDDs), power supply, battery, and electrical components with interface connectors. Some such designs require hefty and complicated latch mechanism or cam-in/-out mechanisms on the mounting parts. In many cases, the latch mechanism works between the HDD and a tray, which makes the precise HDD placement difficult due to multiple parts' cumulative dimensions.

Small form factor of HDD design is important for multiple and dense HDD mounting in the limited space in the system enclosure. A small latch or handle may degrade finger-accessibility and operability for HDD installation and removal. Anti-shock protection is also important for handling multiple HDDs in systems without damaging the HDDs during the installation and removal processes.

FIGS. 1A and 1B illustrate prior art HDDs. In FIG. 1A, there is a guide groove 100 on the cradle and a retention latch 150. The guide groove 100 is used to guide the HDD into the cradle. The retention latch 150 requires a user to use one hand to push in the retention latch 150 and the other hand to pull out the HDD from the HDD cradle. In FIG. 1B, the HDD has four (4) guide pins (e.g., 174, 176) that are inserted into slots in the HDD cradle.

FIG. 2 illustrates a prior art process 200 for removing a HDD from a cradle. The process 200 requires a user to use both hands. For example, in step 1, the HDD is in the cradle. In step 2, the user uses a right hand to push in the retention latch. In step 3, the user uses a left hand to grab hold of the HDD, while still pushing in the retention latch with the right hand. In step 4, the user uses the left hand to pull out the HDD from the cradle, while still pushing in the retention latch with the right hand. In step 5, the user pulls the HDD out of the cradle.

Thus, there is a need in the art for improved tool-less electronic component retention.

SUMMARY OF EMBODIMENTS OF THE INVENTION

Provided is an apparatus comprising a latch mechanism, wherein the latch mechanism comprises a touch point, push points, pull back handles, and a latch tongue adapted to move up and down, wherein the latch tongue is adapted to being inserted into a retention hole.

BRIEF DESCRIPTION OF THE DRAWINGS

Referring now to the drawings in which like reference numbers represent corresponding parts throughout:

FIG. 3A illustrates a top view of a HDD with a latch mechanism in accordance with certain embodiments.

FIG. 3B illustrates a bottom view of a HDD with a latch mechanism in accordance with certain embodiments.

FIGS. 8A, 8B, and 8C illustrate push points on a latch mechanism in accordance with certain embodiments.

FIGS. 9A, 9B, 9C, and 9D illustrate various views of a HDD in accordance with certain embodiments.

FIGS. 10A, 10B, and 10C illustrated views of a latch mechanism in accordance with certain embodiments.

FIGS. 11A and 11B illustrate views of a metal support in accordance with certain embodiments.

FIGS. 12A and 12B illustrate exploded views of a latch mechanism coupled to a metal support in accordance with certain embodiments.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Embodiments provide a latch mechanism coupled to an electronic component (e.g., HDD) and a retention hole on a PCB. Embodiments include an "up and down" latch mechanism on an electronic component (e.g., HDD) and a retention hole (i.e., elongated slot) made on a PCB (Printed Circuit Board).

FIG. 3A illustrates a top view of a HDD 300 with a latch mechanism 310 in accordance with certain embodiments. FIG. 3B illustrates a bottom view of a HDD 300 with a latch mechanism 310 in accordance with certain embodiments.

Figure 1A:
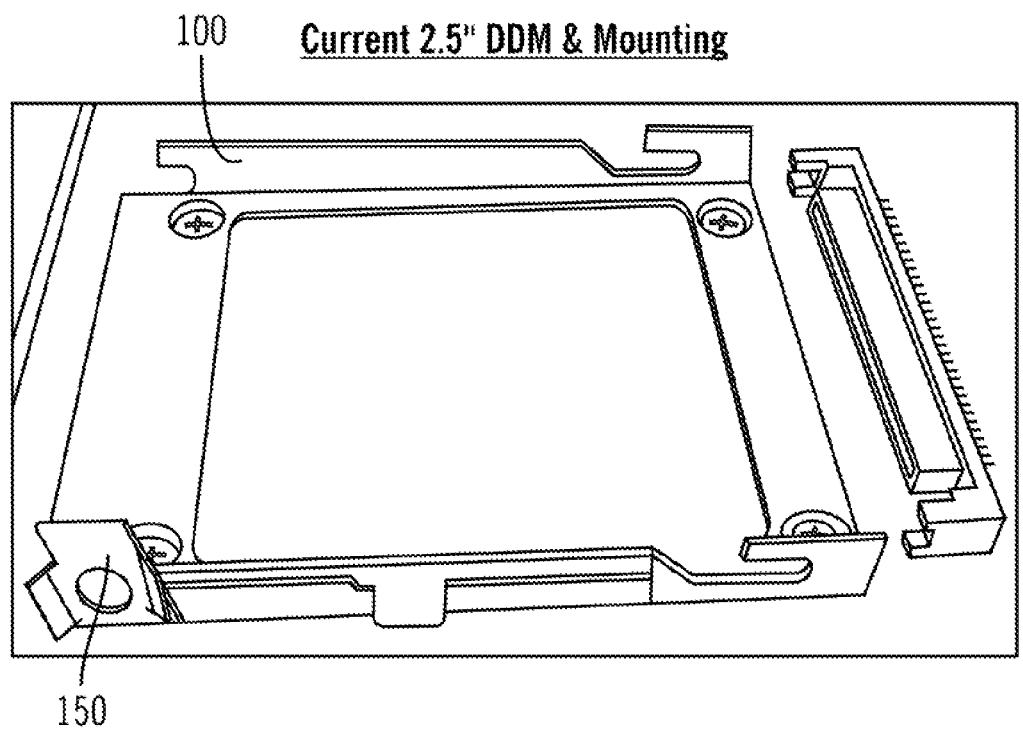
FIGS. 1A and 1B illustrate prior art HDDs.
Figure 1B:
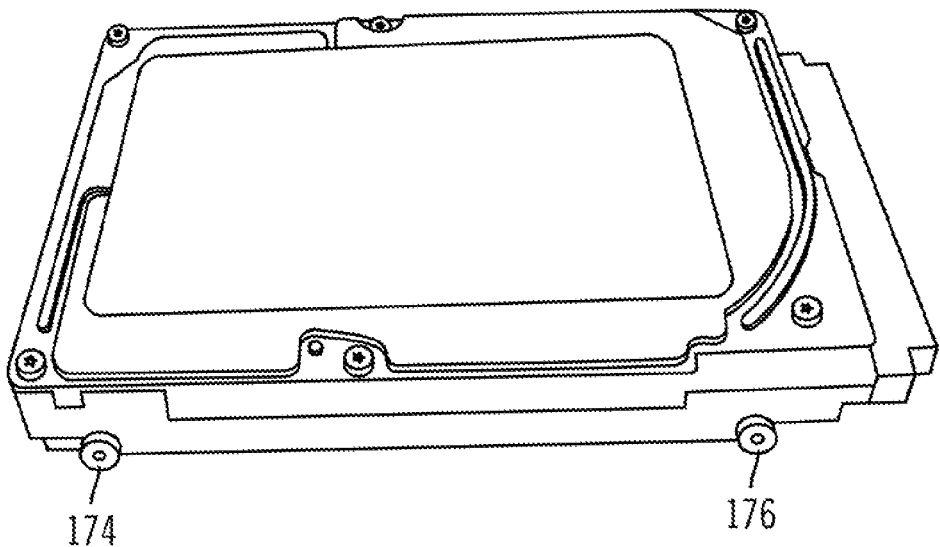
Figure 2:
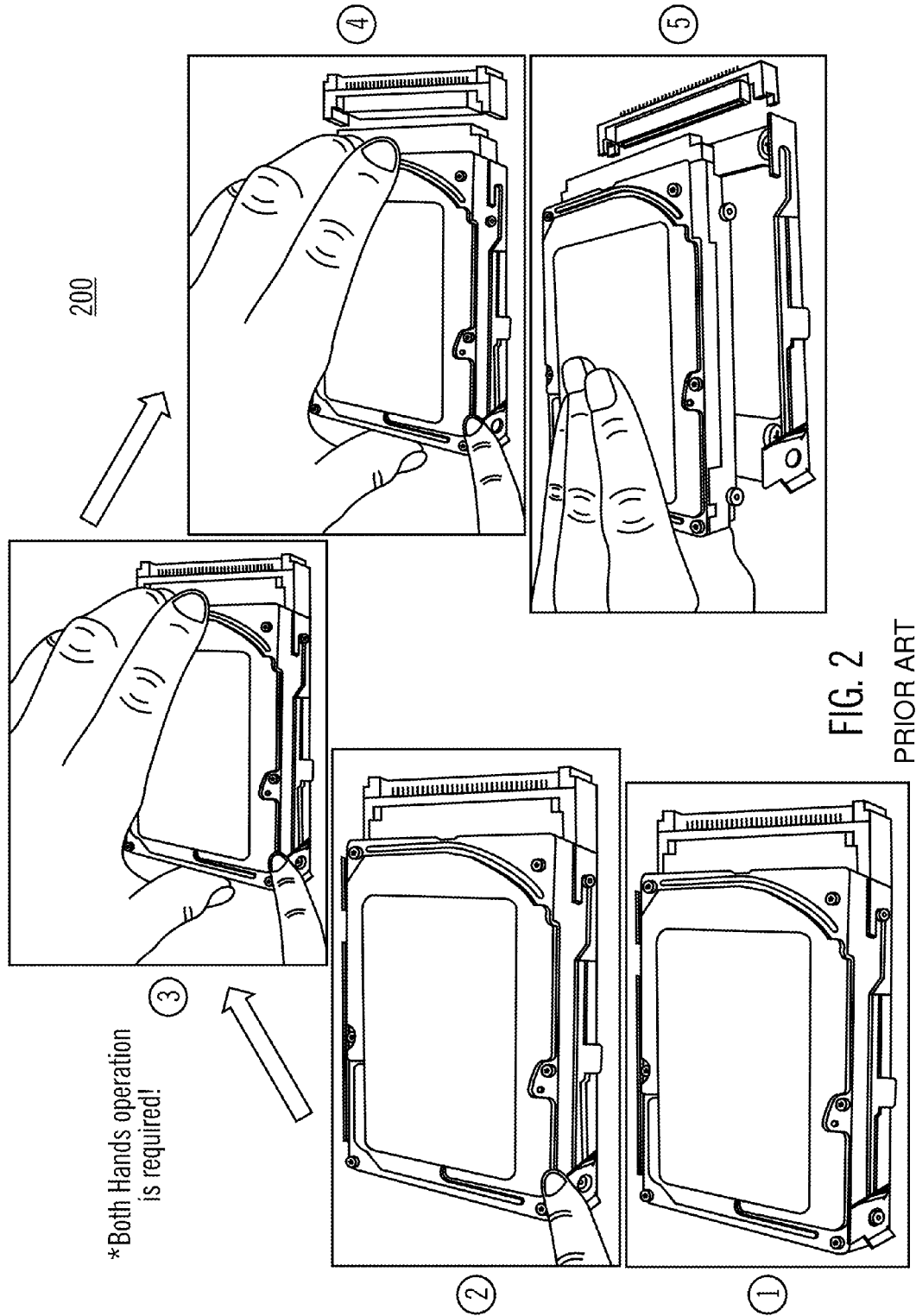
FIG. 2 illustrates a prior art process for removing a HDD from a cradle.
Figure 4B:
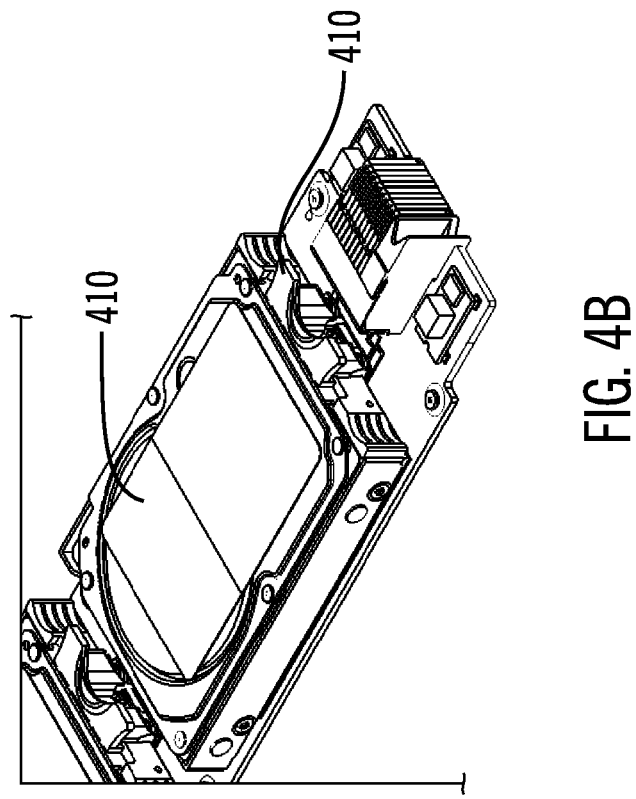
FIGS. 4A and 4B illustrate use of a latch mechanism on a HDD and a retention hole in a Printed Circuit Board (PCB) in accordance with certain embodiments.
Figure 4A:
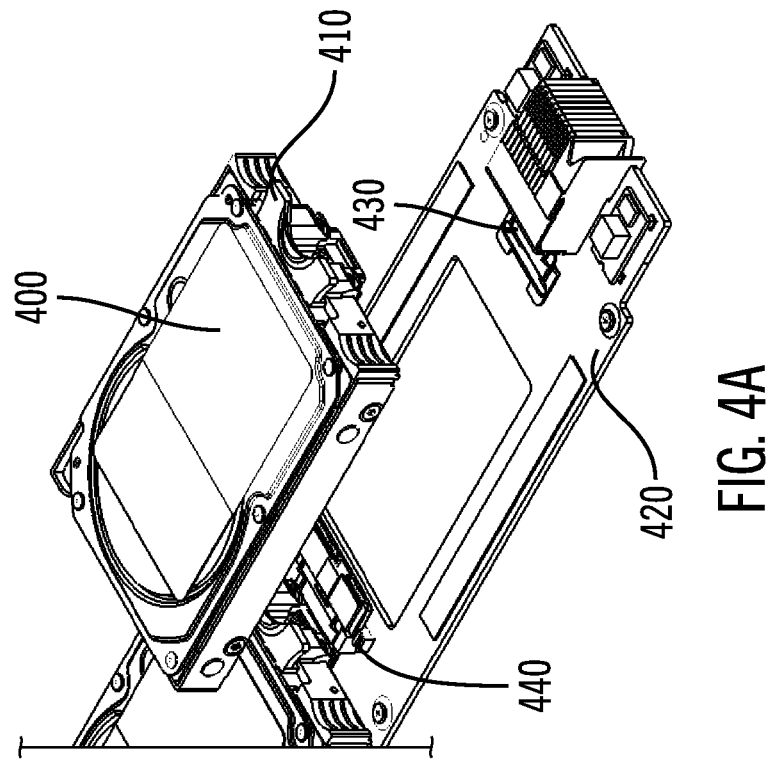

FIGS. 4A and 4B illustrate use of a latch mechanism on a HDD and a retention hole in a PCB in accordance with certain embodiments. FIG. 4A illustrates a HDD 400 with a latch mechanism 410. Also in FIG. 4A, the PCB 420 includes a retention hole 430. It is to be noted that the retention hole 430 is on the opposite end of the PCB 420 from the connector 440 coupled to the PCB 420. Placement of the retention hole 430 in this manner enables precise placement and secure installation within a multi-drive tray and ensures secure electrical connection (between the connector coupled to the HDD 400 and the connector 440 coupled to the PCB 420. The connector coupled to the HDD 400 and the connector 440 coupled to the PCB 420 are capable of being connected together (i.e., may be said to mate). In FIG. 4B, the HDD 400 is secured in the tray with the latch mechanism 410.

Figure 5B:
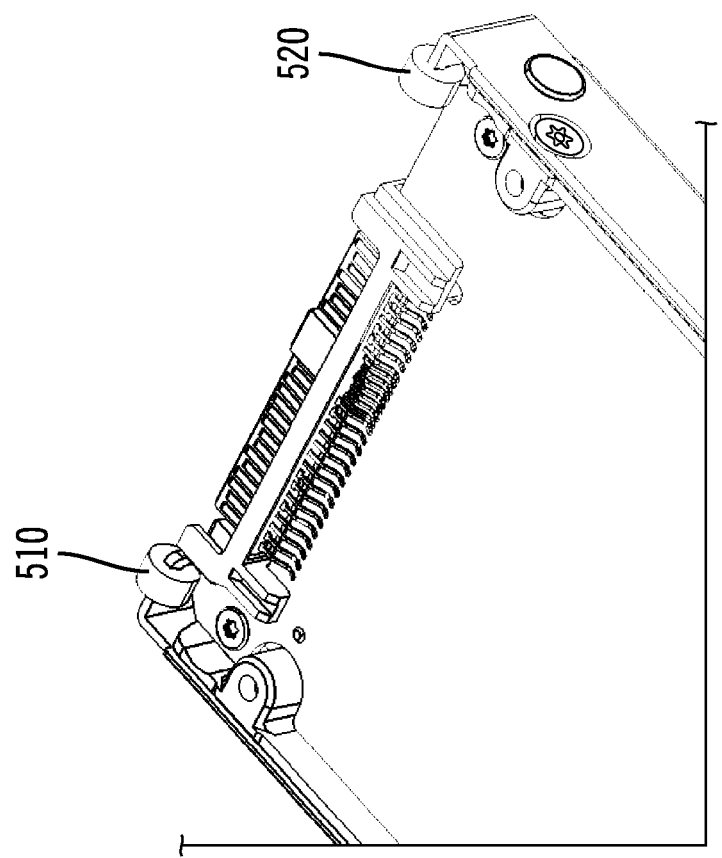
FIG. 5B illustrates a close-up of the rubber bushings in accordance with certain embodiments.
Figure 5A:
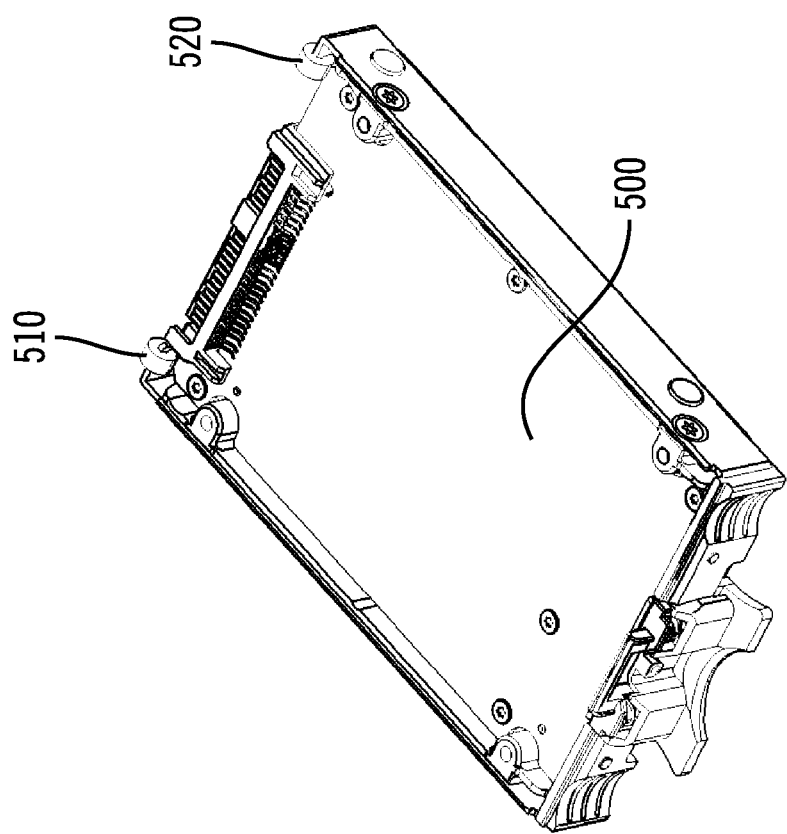
FIG. 5A illustrates and HDD and damping rubber bushings in accordance with certain embodiments.

FIG. 5A illustrates and HDD and damping rubber bushings in accordance with certain embodiments. FIG. 5B illustrates a close-up of the rubber bushings in accordance with certain embodiments. In FIGS. 5A and 5B, the HDD 500 includes two damping rubber bushings 510, 520 that absorb vibrations as the drive in the HDD 500 rotates to store and retrieve data.

Figure 7:
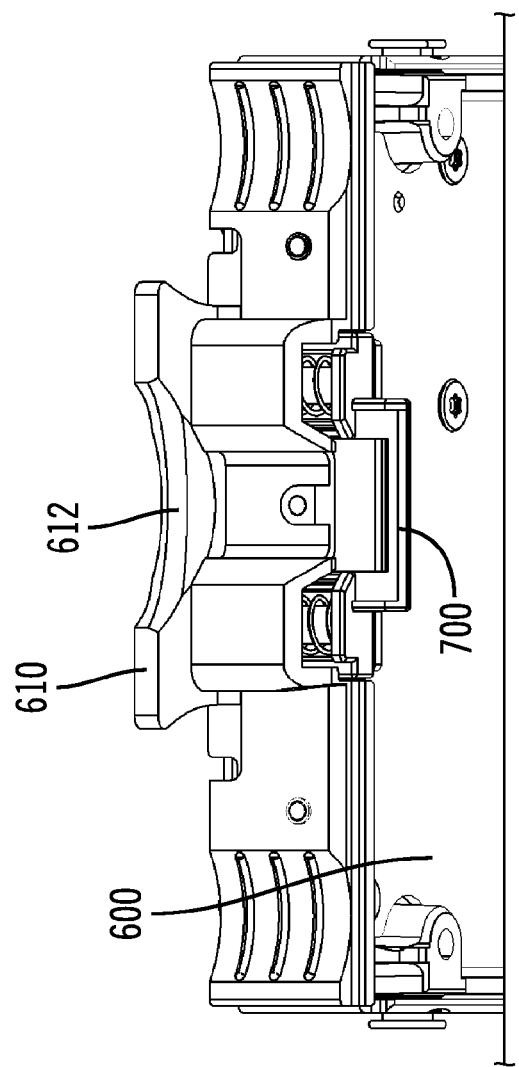
FIG. 7 illustrates a front view of a HDD with a latch mechanism having a specialized handle in accordance with certain embodiments.
Figure 6:
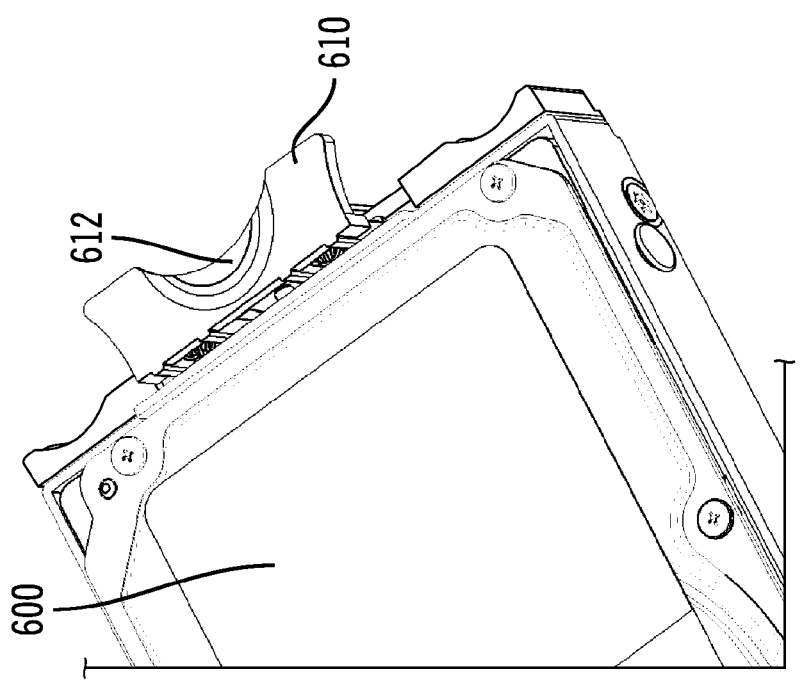
FIG. 6 illustrates a top view of a HDD with a latch mechanism having a specialized handle in accordance with certain embodiments.

FIGS. 6 and 7 illustrate a HDD with a latch mechanism having a specialized handle in accordance with certain embodiments. In FIG. 6, the HDD 600 includes latching mechanism 610. It can be seen that the latching mechanism 610 includes a specialized handle with a touch point 612 (e.g., one that would fit a user's thumb or finger). FIG. 7 illustrates a front view of a HDD with a latch mechanism having a specialized handle in accordance with certain embodiments. From the front view, it can be seen that the latch mechanism 610 coupled to the HDD 600 includes a touch point 612 and a latch tongue 700 (i.e., the portion of the latch mechanism 610 that is inserted into a retention hole). The latch tongue 700 is able to act as a spring damper to absorb both shocks and vibrations. When the latch tongue 700 is in a lowered position, the latch tongue can be seen exiting the retention hole, which enables a user to easily recognize whether the latch mechanism is properly secured.

FIGS. 8A, 8B, and 8C illustrate push points 810, 820 on a latch mechanism 800 in accordance with certain embodiments. FIG. 8A illustrates a side view of push points 810, 820 on latch mechanism 800. The push points 810, 820 enable a user to more easily push the HDD into the tray. In certain embodiments, the push points 810, 820 are curved indentations with grooves. FIG. 8B illustrates a top view of push points 810, 820 on latch mechanism 800. FIG. 8C illustrates a bottom view of push points 810, 820 on latch mechanism 800.

FIGS. 9A, 9B, 9C, and 9D illustrate various views of a HDD 900 in accordance with certain embodiments. FIG. 9A illustrates a view of the latch mechanism 910 on the HDD 900 looking towards the latch mechanism 910 from the opposite end of the HDD 900. FIG. 9B illustrates a top view of the latch mechanism 910 and damping rubber bushings 920, 930. FIG. 9C illustrates a side view of the latch mechanism 910. FIG. 9D illustrates a front view of the latch mechanism.

Figure 10A:
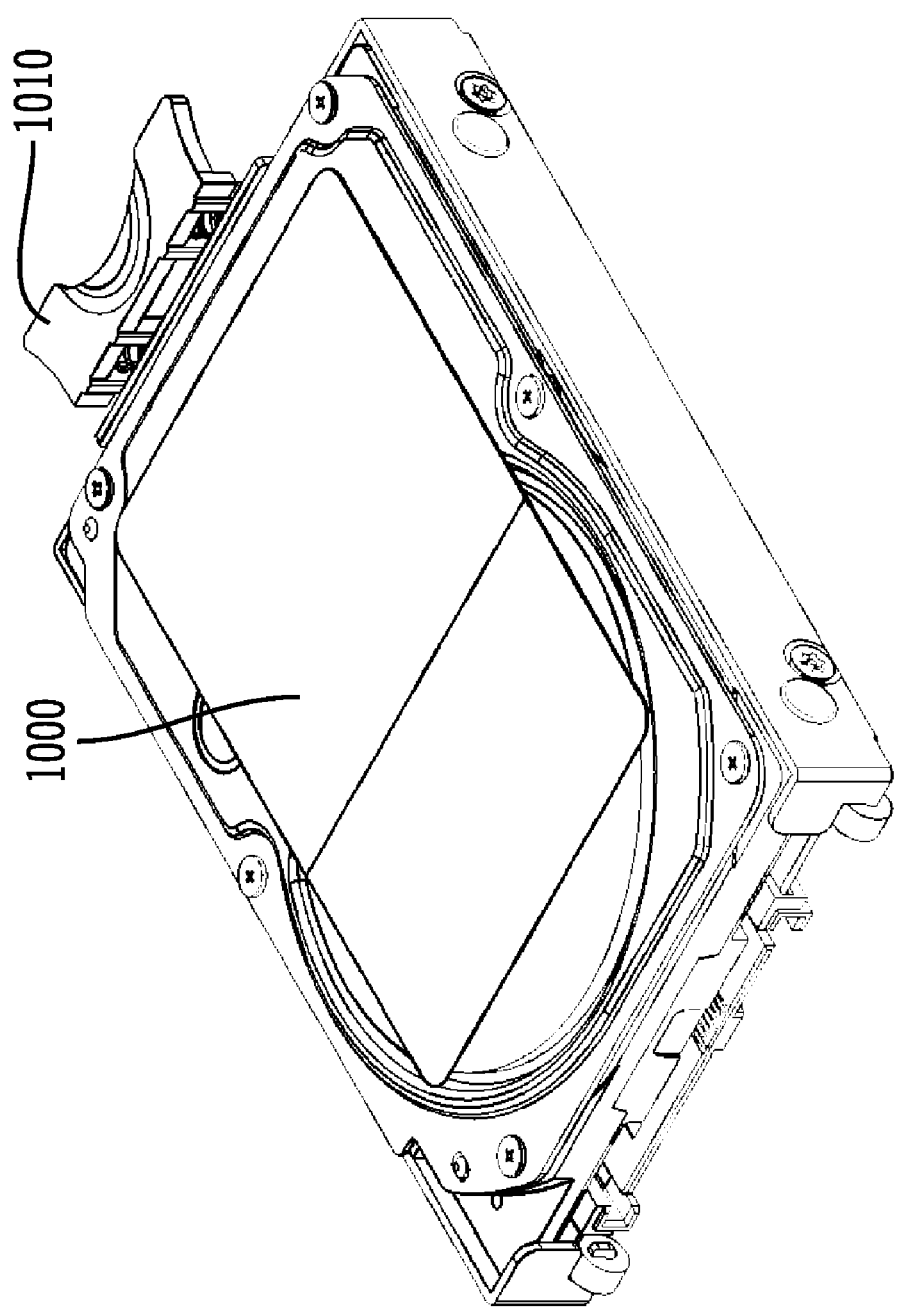

FIGS. 10A, 10B, and 10C illustrated views of a latch mechanism 1010 in accordance with certain embodiments. FIG. 10A illustrates a top view of the HDD 1000 with latch mechanism 1010 being in a raised and unlocked position. FIG. 10B illustrates a front view of the HDD 1000 with the latch mechanism 1010 in a lowered and locked position. In FIG. 10B, the latch tongue 1020 of the latch mechanism 1010 is in a lowered and locked position. FIG. 10C illustrates a front view of the HDD 1000 with the latch tongue 1020 of the latch mechanism 1010 is in a raised and unlocked position.

FIGS. 11A and 11B illustrate views of a metal support 1100 in accordance with certain embodiments. A latch mechanism 1110 is coupled to the metal support 1100, which holds an HDD (not shown). FIG. 11A illustrates a bottom view of the metal support 1100 with the latch mechanism 1110. FIG. 11B illustrates a top view of the metal support 1100. The electronic component is coupled to the metal support using four screws to retain the electronic component (e.g., drive assemble) to the metal support.

FIGS. 12A and 12B illustrate exploded views of a latch mechanism coupled to a metal support 1200 in accordance with certain embodiments. In FIGS. 12A and 12B, the latch mechanism includes a latch head 1220, a latch front 1230, and springs 1240, 1242 Screws 1250, 1252, 1254 are used to couple the metal support 1200 to the latch head 1220 and latch front 1230. Damping rubber bushings 1260, 1262 are also coupled to the metal support 1200.

Figure 14:
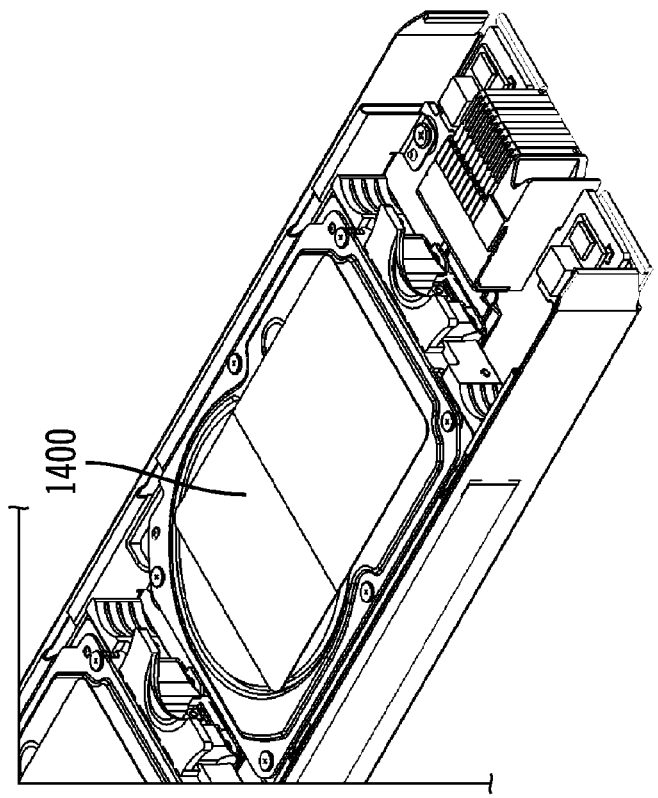
FIG. 14 illustrates an HDD after being installed into a tray in accordance with certain embodiments.
Figure 13:
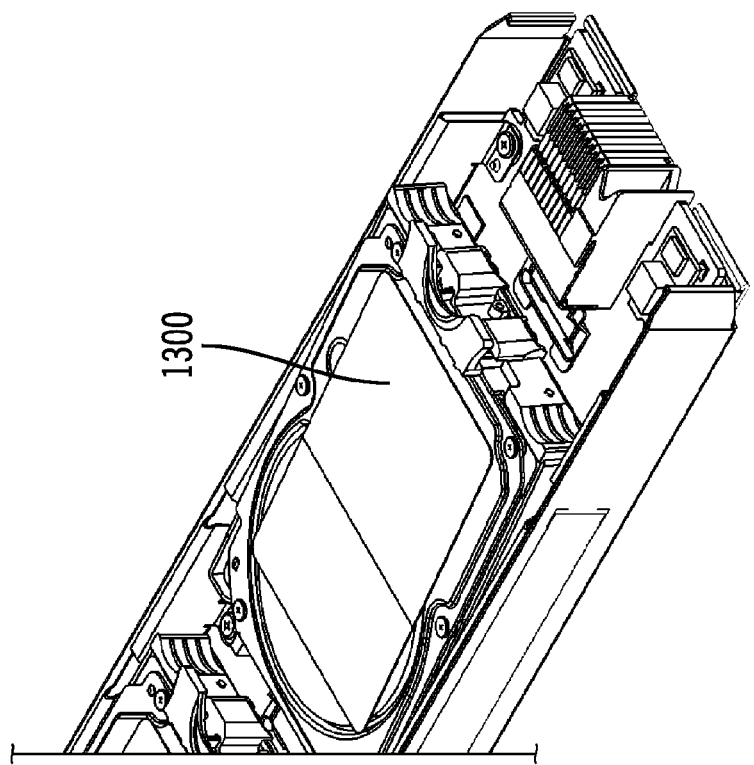
FIG. 13 illustrates an HDD being installed into a tray in accordance with certain embodiments.

FIG. 13 illustrates an HDD 1300 being installed into a tray in accordance with certain embodiments. FIG. 14 illustrates the HDD 1300 after being installed into the tray in accordance with certain embodiments.

Figure 15A:
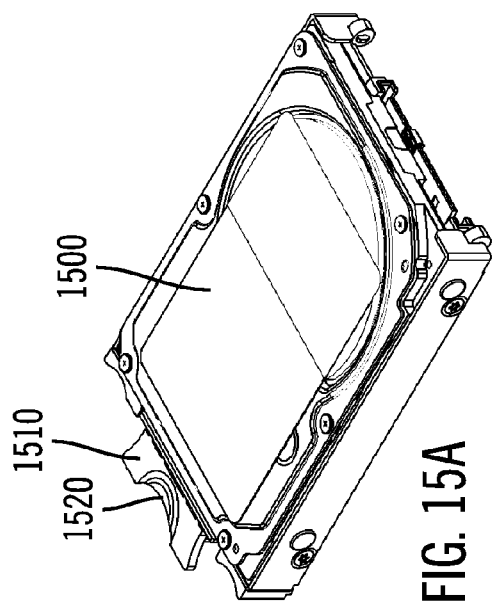
FIGS. 15A, 15B, and 15C illustrate views of a HDD and latch mechanism in accordance with certain embodiments.
Figure 15B:
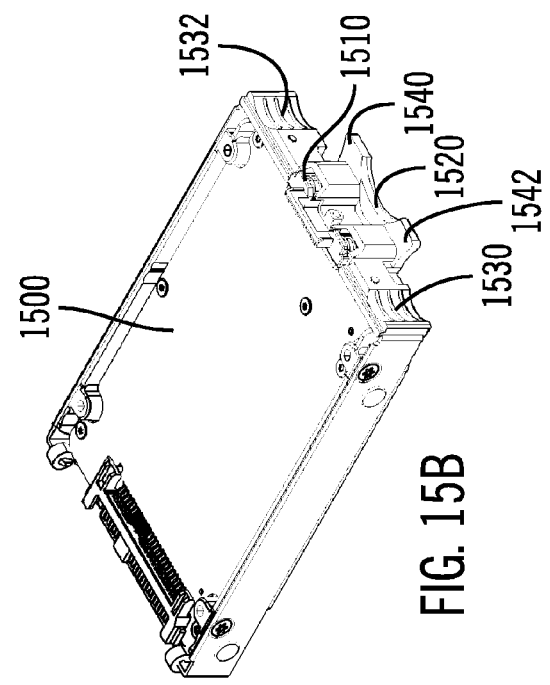
Figure 15C:
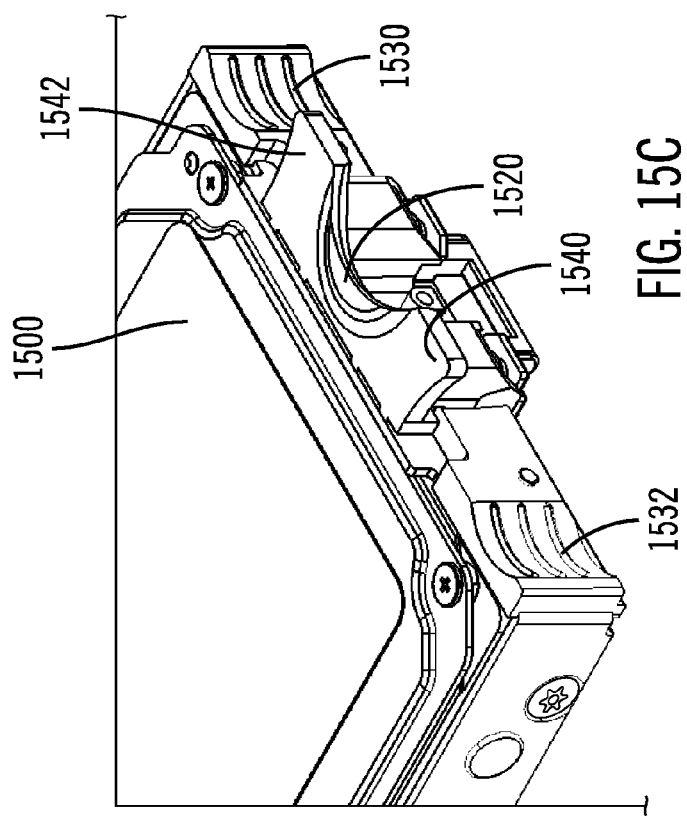

FIGS. 15A, 15B, and 15C illustrate views of a HDD 1500 and latch mechanism 1510 in accordance with certain embodiments. FIG. 15A illustrates a top view of the HDD 1500 and the latch mechanism 1510, while FIG. 15B illustrates a bottom view of the HDD 1500 and the latch mechanism 1510. FIG. 15C illustrates a sectional view of the HDD 1500 and the latch mechanism 1510. The touch point 1520 (i.e., finger hold), push points 1530, 1532, and pull back handles 1540, 1542 enable a single hand operation for HDD installation by the domed shape (i.e., the curved top center portion forming the touch point of the latch mechanism is a domed shape) and removal by the pull back handles. In particular, a user may use the touch point 1520 and push points 1530, 1532 for installation. The user may then use the pull back handles 1540, 1542 for removal of the HDD 1500 from the tray. In certain embodiments, the pull back handles are curved indentations of the head of the latch mechanism. The design of the latch mechanism is easy to use, intuitive (i.e., user friendly), and tool-less (e.g., does not require a screw driver or other tools).

As an example, a user may hold the touch point of the latch mechanism to insert an HDD into a tray. The user may also use the push points to push the HDD into the tray to complete the insertion so that the latch tongue is inserted into the retention hole and the latch mechanism is in a locked position. The user may later use the pull back handles to raise the latch tongue so that the latch mechanism is in an unlocked position and remove the HDD from the tray.

Thus, embodiments provide a tool-less and small form factor design for electronic component (e.g., HDD) mounting/retention. In certain embodiments, such a design is applicable to server and storage systems with multiple and dense HDD mounting.

When mounting small form factor HDDs in a tray, embodiments enable single hand operation for HDD installation and removal, with unique handle usability features; anti-shock rubber feet and spring damper on the HDD for damage protection; and HDD retention with a latch mechanism on the HDD and a retention hold on the PCB. The HDD includes a connector that connects to a connector on a PCB, and the latch mechanism is on the opposite side of the connector on the PCB.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. An apparatus, comprising:
a single latch mechanism coupled to a center of one end of a metal support holding an electronic component, wherein the latch mechanism comprises a touch point and a latch tongue adapted to move up and down, wherein the latch tongue is adapted to being inserted into a single retention hole on a printed circuit board, wherein the retention hole on the printed circuit board is horizontally across from a connector coupled to the printed circuit board, wherein the latch tongue acts as a spring damper to absorb shocks and vibrations, wherein, when the latch tongue is in a lowered position, the latch tongue exits the retention hole and performs a locking function to secure the electronic component to the printed circuit board, and wherein the latch mechanism further comprises a plurality of push points, the push points being located on a surface perpendicular to the touch point, the push points comprising curved indentations with grooves, and the touch point comprising a curved, domed shape.

2. The apparatus of claim 1, wherein the retention hole is an elongated slot of the printed circuit board.

3. The apparatus of claim 1, wherein the latch tongue is adapted to being moved down into the retention hole to perform the locking function without use of tools.

4. The apparatus of claim 1, wherein the latch tongue is adapted to being moved up out of the retention hole to perform an unlocking function.

5. The apparatus of claim 1, wherein the electronic component is coupled to the latch mechanism and is coupled to damping rubber bushings for absorption of vibrations and wherein the electronic component includes a first connector that connects to the connector on the printed circuit board, and wherein the latch mechanism is located on an opposite side of the first connector.

6. The apparatus of claim 5, wherein the electronic component is a disk drive module.

7. The apparatus of claim 1, wherein the touch point is a portion of the latch mechanism.

8. The apparatus of claim 1, wherein the push points are adapted to be used to push the electronic component into a tray so that the latch tongue is inserted into the retention hole with single hand operation.

9. The apparatus of claim 1, wherein the latch mechanism comprises pull back handles, wherein the pull back handles are curved indentations on a head of the latch mechanism, and wherein the pull back handles are adapted to be used to raise the latch tongue out of the retention hole with single hand operation.

10. An apparatus, comprising:
an electronic component coupled to a single latch mechanism, wherein the latch mechanism includes a touch point, push points, pull back handles, and a latch tongue adapted to move up and down, wherein the latch tongue is adapted to being inserted into a single retention hole located on a printed circuit board when the latch mechanism is in a locked position to secure the electronic component to the printed circuit board, wherein the retention hole is at an opposite end and across from a connector coupled to the printed circuit board, wherein the latch tongue can be seen exiting the retention hole in the locked position, wherein the latch tongue is adapted to being raised out of the retention hole when the latch mechanism is in an unlocked position, and wherein the push points are located on a surface perpendicular to the touch point, the push points comprising curved indentations with grooves, and the touch point comprising a curved, domed shape.

11. The apparatus of claim 10, wherein the electronic component is coupled to a latch mechanism at one end and coupled to a first connector at an opposite end from the latch mechanism, and wherein the first connector coupled to the electronic component mates with a second connector coupled to the printed circuit board, and wherein the latch tongue is inserted into the retention hole.

12. The apparatus of claim 10, wherein the touch point is a portion of the latch mechanism.

13. The apparatus of claim 10, wherein the pull back handles are curved indentations on a head of the latch mechanism.

14. An apparatus, comprising:
a disk drive module comprising a hard disk drive coupled to a metal support, wherein a center of one end of the metal support is coupled to a single latch mechanism, wherein the latch mechanism includes a domed touch point, two push points adapted to push the electronic component into a tray with a first single hand operation, two pull back handles adapted to remove the electronic component with a second single hand operation, and a latch tongue adapted to move up and down, wherein the latch tongue is adapted to being inserted into a single retention hole located on a printed circuit board to secure the disk drive module to the printed circuit board, and wherein the two push points are located on a surface perpendicular to the touch point, the two push points comprising curved indentations with grooves, and the touch point comprising a curved shape.

15. The apparatus of claim 14, wherein the latch tongue is adapted to being moved down into the retention hole to perform a locking function.

16. The apparatus of claim 14, wherein the latch tongue is adapted to being moved up out of the retention hole to perform an unlocking function.

* * * * *